United States Patent

[11] 3,633,900

[72] Inventor  Gunnar E. Olson
              West St., Columbia, Conn. 06237
[21] Appl. No. 47,777
[22] Filed    June 19, 1970
[45] Patented Jan. 11, 1972

[54] THREE-JAW MACHINE VISE
     8 Claims, 7 Drawing Figs.
[52] U.S. Cl. .................................................. 269/156,
                                              269/137, 279/110
[51] Int. Cl. ........................................................ B25b 1/02,
                                              B23q 3/06, B25b 1/24
[50] Field of Search ........................................... 269/156,
                                              133, 137; 279/1 L, 110

[56]              References Cited
              UNITED STATES PATENTS
1,321,734  11/1919  Gordon .....................  269/156 X
1,586,139   5/1926  Bivins ......................  269/156 X
2,516,648   7/1950  Ruch .......................  269/137 X
2,678,218   5/1954  Oslund .....................  279/110 X
              FOREIGN PATENTS
  827,923   1/1952  Germany ...................  269/156

Primary Examiner—Wayne A. Morse, Jr.
Attorney—McCormick, Paulding & Huber

ABSTRACT: A three-jaw machine vise having universally movable jaws which are supported on carriers movable relative to a backplate or base and so constructed that an elongated workpiece can be loaded from the top or side between a pair of the jaws and in movement toward the third jaw.

PATENTED JAN 11 1972

*INVENTOR.*
GUNNAR E. OLSON

BY McCormick, Paulding & Huber

ATTORNEYS

FIG. 2
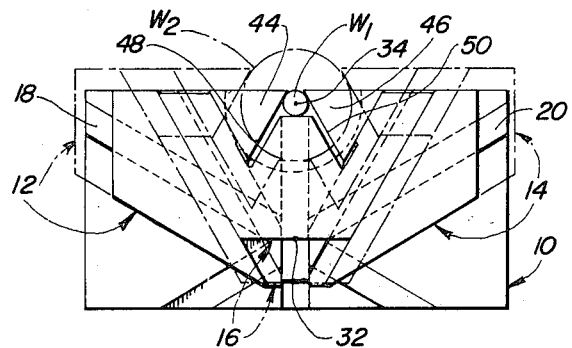
FIG. 3
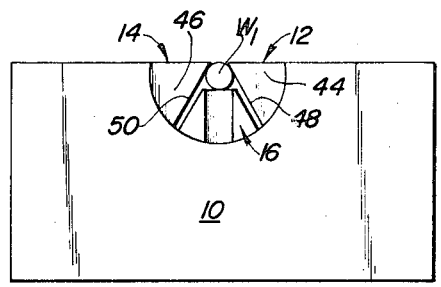
FIG. 4     FIG. 5     FIG. 6
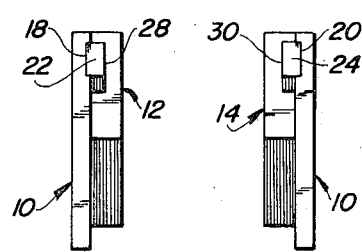
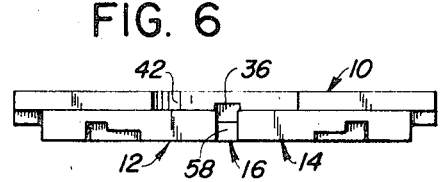
FIG. 7
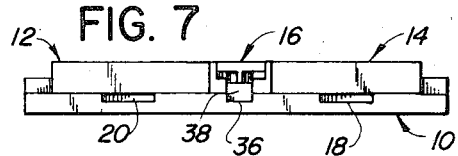

THREE-JAW MACHINE VISE

BACKGROUND OF THE INVENTION

The invention relates to a three-jaw machine vise or chuck of such type which is ordinarily not to be rotated. That is, the vise of this invention is utilized to hold a workpiece which need not be rotated while work is done on it. Such vises are oftentimes used to provide a jig or fixture for a machine tool, such as a drill press, wherein the work is to be held at a desired location on center with the tool, such as the drill, performing the work thereon.

Two-jaw vises are ordinarily used for this purpose, the jaws being provided with V-cut jaw faces so as to clamp the work firmly. In many cases, it is desirable to have a three-jaw vise for this purpose, but most three-jaw vises are difficult to use and are cumbersome in operation, particularly in cases where it is desirable to load and unload the work from the side of the vise. That is, many three-jaw chucks require that the work be loaded and unloaded by movement into and out of the vise along the center line upon which the work on the workpiece is to be performed.

In accordance with the present invention there is provided a three-jaw vise wherein the jaws are movable universally and which provides ease of loading and unloading from the side or top of the vise.

SUMMARY OF THE INvENTION

As will be described in greater detail hereinafter, the vise provided according to the present invention utilizes a backplate which, for convenience of description, is shown in the drawing and referred to as being vertical. It will be understood, however, that the orientation of the vise can be changed so that the backplate or base may be disposed in a horizontal plane or in a plane at any other angle. This backplate or base has guide means on it for guiding the movement of the three jaws. Two of the jaws, which will be referred to as side jaws, are supported on carriers which move on the guide means on the backplate in generally opposed relationship but which are constrained to movement on paths which intersect below the center upon which the work is to be held and which diverge from said point of intersection upwardly and outwardly toward the sides of the backplate. A third jaw carrier, which is the bottom jaw carrier, is guided in a path of vertical movement between the point of intersection and the workpiece center. The bottom jaw carrier is slidably connected to each of the side jaw carriers so that forced movement of anyone of the carriers effects similar movement of the other carriers and such movement is of equal scope. That is, in the closing movement of the jaw carriers, the two side jaw carriers move along their respective paths toward their point of intersection while the bottom jaw carrier moves along its path toward the center of the workpiece. In opening operation of the vise, the carriers move in the opposite direction.

In the preferred form of the invention, the jaw carriers are connected to and guided by the backplate on tongue and groove guide means, and tongue and groove means is utilized to effect the connection between the bottom carrier and the respective side jaw carriers. The carriers support jaws having faces which are preferably cut at a right angle to their respective paths of movement or to the paths of movement of their associated carries. Further, by preference, the jaws, jaw carriers, and the paths of movement are so constructed and arranged that a circular workpiece of any size insertable in the vise will be engaged by the jaws at points spaced circumaxially 120° apart, and all circular workpieces will be engaged so that their centers fall on a common point.

BRIEF DESCRIPTION OF THE DRAWINGS

FIG. 2 is a front elevational view of the vise showing it closed upon a workpiece of circular configuration, and also showing in broken outline the jaws of the device closed upon another workpiece of circular cross section but of greater diameter.

FIG. 3 is a rear elevational view of the vise as shown in FIG. 2.

FIG. 4 is a left-hand side view of the vise as it is shown in FIG. 2.

FIG. 5 is a right-hand side view.

FIG. 6 is a top view of the vise as viewed in FIG. 2.

FIG. 7 is a bottom view of the vise.

DESCRIPTION OF THE PREFERRED EMBODIMENT

Figure 1:
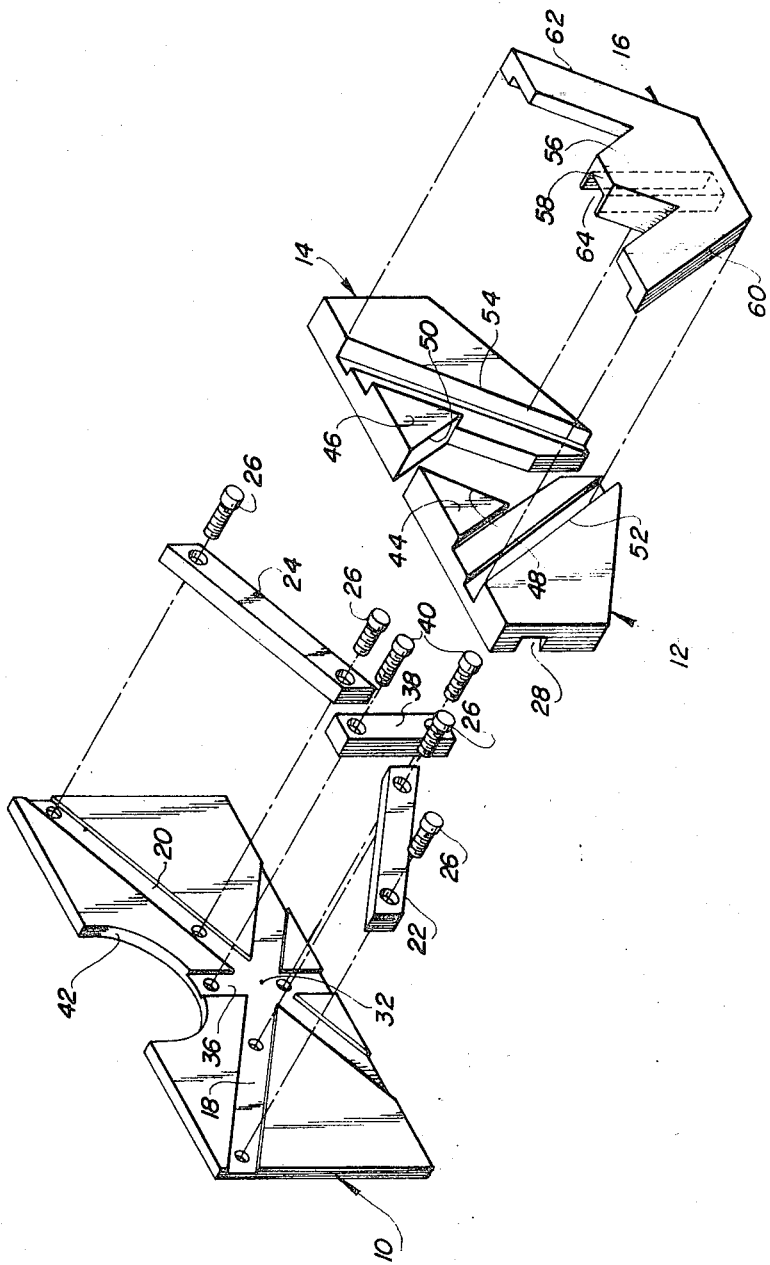
FIG. 1 is a perspective view showing the parts of the vise in exploded relationship to each other.

The principal and fundamental elements of the vise of this invention comprise a backplate or base 10, a pair of side jaw carriers which are respectively identified generally as the left-hand side jaw carrier 12 and the right-hand side jaw carrier 14, and a bottom jaw carrier identified generally by the reference number 16. As has been mentioned, the backplate or base 10 is adapted to guide the generally opposed side jaw carriers 12 and 14 in movement relative to each other and to the said backplate. In the embodiment shown, the means for guiding the side jaw carriers in movement relative to the backplate comprises a pair of rectilinear grooves 18 and 20 which are machined in the front face of the backplate to receive a pair of guide bars 22 and 24 for the left side jaw carrier 12 and the right side jaw carrier 14, respectively. The bars 22 and 24 are fixedly secured to the backplate 10 as by countersunk screws 26, 26. The groove 18 with the bar 22 therein constitutes a guide tongue on the backplate 10 for the left-hand side jaw carrier 12 which has a complementary groove 28 formed therein. The groove 20 and the guide bar 24 combine to provide a guide tongue received within a complementary groove 30 (FIG. 5) formed in the right-hand side jaw carrier 14. The grooves 18 and 20 intersect at a point of intersection 32 which, as will be noted by reference to FIGS. 1 and 2, is disposed vertically below the center 34 of a workpiece which is to be held in the vise whether such workpiece be of relatively small diameter as shown by the workpiece W1 or relatively large diameter as shown by the workpiece W2. Thus, the paths of movement of the side jaw carriers 12 and 14 relative to each other and relative to the backplate 10 diverge from the point of intersection 32 upwardly and toward the sides of the said backplate. In the preferred form, the paths of movement for the side jaw carriers diverge from each other, each at an angle of 60° with reference to a vertical line drawn upwardly from the point of intersection 32. The line drawn upwardly in a vertical plane will extend to the center 34 of any workpiece held in the vise.

The backplate 10 in the preferred construction also has a vertical groove 36 (FIG. 1) to receive a guide bar 38 which is secured within the groove as by a pair of screws 40, 40. This guide bar, as will be more fully described hereinafter, is utilized as a tongue in a tongue and groove connection with the bottom jaw carrier 16 to constrain its movement relative to the backplate 10 in a vertical path from the point of intersection 32 toward and away from the center point 34.

The backplate 10 is further characterized by provision of a deep notch 42 in its upper edge and which is centrally located. The notch 42 is provided to accommodate workpieces having portions thereof which extend rearwardly of the backplate 10 so that said workpieces can be loaded and unloaded from the top of the vise.

The left-hand and right-hand side jaw carriers 12 and 14 are mirror images of each other. Each such side jaw carrier is provided with an integrally formed or rigidly attached jaw, the jaw for the carrier 12 being indicated by the reference number 44 and the jaw for the carrier 14 being indicated by the reference number 46. A jaw face 48 is cut in the jaw 44, preferably at a right angle to the path of movement of its associated carrier 12, such path of movement being defined by the groove 18 in the backplate 10. A face 50 is cut in the jaw 46, again preferably at a right angle to its path of movement with the jaw carrier 14 as defined by the groove 20 in the backplate 10 and by the guide bar or tongue 24 and slot or groove 30 in the said side jaw carrier.

The mirror image side jaw carriers 12 and 14 are further characterized in that they cooperate with the bottom jaw carrier 16 to provide a sliding connection between each such side jaw carrier and the bottom jaw carrier. More specifically, the side jaw carrier 12 is shown to have defined therein a compound groove 52 and the side jaw carrier 14 is shown to have defined therein a compound groove 54. The grooves 52 and 54 also diverge from a vertical line extending from the workpiece center 34 and the first mentioned point of intersection 32 and downwardly therefrom. That is, the grooves 52 and 54 in the side jaw carriers when assembled on the backplate 10 intersect at a point (not shown) which is well below the point of intersection 32 for the grooves 18 and 20. Further, in the preferred embodiment, the said grooves 52 and 54 diverge from the vertical line, each at an angle of 30° to such vertical line upwardly and toward the top edge of the respective jaw carrier.

The bottom jaw carrier 16, as best shown in FIG. 1, is W-shaped having a central portion 56 which is integrally formed, as shown, or rigidly secured thereto to define the bottom jaw having a work engaging face 58. The bottom jaw carrier 16 also has left- and right-hand wing or tongue portions 60 and 62 which fit within the respective grooves 52 and 54 in the left- and right-hand jaw carriers 14 to complete the sliding connection therewith. The bottom jaw carrier 16 is also provided with a vertical groove 64 extending through its jaw portion 56 and which receives in a tongue and slot or groove relationship the guide bar 38 secured to the backplate 10.

It is important to observe that with the arrangement of the side jaw carriers 12 and 14 to move outwardly and upwardly at a 60° angle to the vertical line through their point of intersection and with the tongue and groove sliding interconnection between the bottom jaw 16 and the said side jaws arranged so that the grooves 52, 54 and the tongues 60, 62 are at a 30° angle each to the said vertical line, the outward and upward movement of either side jaw will be accompanied by vertically upward movement of the bottom jaw and similar outward and upward movement of the other side jaw. Similarly, when either side jaw is moved downwardly and inwardly, the bottom jaw will move downwardly and the other side jaw will move downwardly and inwardly also. With the angular relationship shown in the guide means effecting connection between the backplate and the two side jaws and the sliding interconnection between the bottom jaw carrier and the two side jaws or two side jaw carriers, movement of any jaw carrier will be accompanied by a movement of the same distance by any other jaw carrier. It is contemplated that the vise will be power operated, preferably by power means utilized to move both side jaw carriers along their paths as defined by the grooves 18 and 20. However, the power means can be applied to any jaw, including the bottom jaw.

It is also important to observe that movement of the side jaws toward and away from the point of intersection 32 of the paths of movement takes place during closing and opening operation, respectively, of the vise. At the same time, the bottom jaw carrier 16 moves toward and away from the center 34 in the closing and opening operation of the vise. A further important consideration is the fact that the face 58 on the bottom jaw 16 is horizontal and thus at a right angle to the path of movement of the bottom jaw carrier.

With this arrangement and angular relationship of the parts and their paths of movement, the jaw work faces or work-engaging faces 48, 50 and 58 will engage circular workpieces at points spaced 120° apart circumaxially around the center of each circular workpiece, and all circular workpieces of different diameter which can be accommodated in the vise will be held on the same center or horizontal center line. Such workpieces, whether or not they be circular in cross section, can be loaded into the vise from the top thereof by being thrust between the two side jaw carriers 12 and 14 when they are separated in movement toward the bottom jaw carrier 16.

A further advantage obtained with the construction shown is that any workpiece of any diameter which can be supported in the vise will have its top surface exposed between the side jaws so that operations can be performed on it.

For convenience of illustration, no means has been shown to hold the various parts of the vise in assembled relationship. This can be accomplished in various ways. For example, a front plate may be secured to the backplate from the front of the jaw carriers in such manner as to permit the described movement of the said carriers. The parts could also be secured in assembled relationship by utilizing dove-tailed tongues and grooves for the tongue and groove connections shown and described.

I claim:

1. A top-loading three-jaw machine vise for holding a workpiece on a center spaced between the three jaws and comprising a backplate having means thereon for guiding a pair of generally opposed side jaw carriers in movement relative to each other and to said backplate along respective paths which diverge upwardly and toward the sides of the backplate from a point of intersection spaced vertically below said center, a mirror image pair of side jaw carriers movable on their said paths toward and away from said point in the respective closing and opening operation of the vise, a bottom jaw carrier having means thereon effecting a sliding connection with each side jaw carrier, said means effecting such sliding connection being constructed and arranged to effect vertical movement of said bottom jaw carrier in a path between said point and said center with movement of said side jaw carriers, the said bottom jaw carrier moving toward and away from said center in the respective closing and opening operation of the vise, and a jaw on each of said jaw carriers having a work-engaging face, the jaw faces on the side carriers engaging the work above said center and the jaw face on the bottom carrier engaging the work below said center.

2. A vise as defined in claim 1 wherein said backplate has a notch in its upper edge to accommodate loading and unloading of workpieces which are to be supported in the vise with a portion extending rearwardly of the backplate.

3. A vise as defined in claim 1 wherein the guide means on said backplate and the means effecting sliding connection between said bottom jaw carrier and the side jaw carriers are so constructed and arranged with respect to each other that all three jaw carriers move distances equal to each other for any movement of any carrier, the side jaw carriers along their intersecting paths and the bottom jaw carrier along its vertical path.

4. A vise as defined in claim 3 wherein the paths of said side jaw carriers diverge from said point of intersection each at an angle of 60° from a vertical line extending upwardly from said point of intersection to said center.

5. A vise as set forth in claim 4 wherein the guide means on said backplate also includes a guide for the vertical movement of said bottom jaw carrier.

6. A vise as set forth in claim 4 wherein the jaw face on each of the three jaws is disposed at a right angle to the path of movement of its associated jaw carrier and whereby workpieces of circular cross section but of different diameter will all be supported on the same center and engaged by jaw faces at points circumaxially spaced 120° apart about said center.

7. A vise as set forth in claim 6 wherein the means for guiding the side jaw carriers relative to said backplate comprises tongue and groove connections therebetween and the means effecting a sliding connection between the bottom jaw carrier and each side jaw carrier also comprises a tongue and groove.

8. A vise as set forth in claim 7 wherein said backplate has a notch in its upper edge to accommodate loading and unloading of workpieces which are to be supported in the vise with a portion extending rearwardly of the backplate.

* * * * *